United States Patent
Line et al.

(10) Patent No.: US 11,351,898 B2
(45) Date of Patent: Jun. 7, 2022

(54) ACCESSORY SUPPORT ASSEMBLY FOR A VEHICLE SEAT

(71) Applicant: Ford Global Technologies, LLC, Dearborn, MI (US)

(72) Inventors: Johnathan Andrew Line, Northville, MI (US); Deeptej Kudav, Southgate, MI (US); Robert Charles Shipley, Plymouth, MI (US); Kevin Wayne Preuss, Berkley, MI (US); Anna Frances Hardig Hendrickson, Southfield, MI (US); Rodney Charles Brinker, Eastpointe, MI (US); Nicholas Alphonse Billardello, Macomb, MI (US); Joseph Kafati, Birmingham, MI (US); Peter Ryan, Waterford, MI (US); Andre John Van Schyndel, Kanata (CA); Alan Peter Norton, West Bloomfield, MI (US); Nanki Sahota, Waltham, MA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/071,187

(22) Filed: Oct. 15, 2020

(65) Prior Publication Data
US 2022/0118893 A1    Apr. 21, 2022

(51) Int. Cl.
*B60N 2/68* (2006.01)
*B60N 2/80* (2018.01)
(Continued)

(52) U.S. Cl.
CPC ............... *B60N 2/68* (2013.01); *B60N 2/80* (2018.02); *B60N 2/976* (2018.02);
(Continued)

(58) Field of Classification Search
CPC .... B60N 2/68; B60N 2/97; B60N 2/80; B60R 11/0217; B60R 11/0229; B60R 2011/0015
(Continued)

(56) References Cited

U.S. PATENT DOCUMENTS

| 6,698,832 | B2* | 3/2004 | Boudinot | B60N 2/879 |
| | | | | 297/217.4 |
| 6,928,654 | B2* | 8/2005 | Tranchina | H04N 5/4401 |
| | | | | 725/75 |

(Continued)

FOREIGN PATENT DOCUMENTS

EP    2528473 B1    10/2016

*Primary Examiner* — Mark R Wendell
(74) *Attorney, Agent, or Firm* — Vichit Chea; Price Heneveld LLP

(57) ABSTRACT

An accessory support assembly for a vehicle seat includes a support frame that includes an upper bracket and a lower bracket coupled to a bottom of the upper bracket. The lower bracket includes coupling features. The lower bracket defines side projections that extend from opposing sides of the support frame. A speaker assembly is coupled to the support frame. The speaker assembly includes a first speaker housing and a second speaker housing. The first and second speaker housings are coupled to the side projections of the support frame, respectively. A speaker is disposed in each of the first and second housings.

18 Claims, 13 Drawing Sheets

(51) Int. Cl.
*B60R 11/02* (2006.01)
*B60N 2/90* (2018.01)
*B60R 11/00* (2006.01)

(52) U.S. Cl.
CPC ...... *B60R 11/0217* (2013.01); *B60R 11/0229* (2013.01); *B60R 2011/0015* (2013.01)

(58) Field of Classification Search
USPC ..................................................... 297/217.3
See application file for complete search history.

(56) References Cited

U.S. PATENT DOCUMENTS

| | | | | |
|---|---|---|---|---|
| 7,866,746 | B2 * | 1/2011 | Watanabe | B60R 11/0235 297/217.3 |
| 8,141,948 | B2 | 3/2012 | Casseilia et al. | |
| 8,160,267 | B2 | 4/2012 | Sakamoto | |
| 9,586,532 | B1 * | 3/2017 | Gough | E05F 3/20 |
| 10,035,442 | B2 | 7/2018 | Kondrad et al. | |
| 10,384,566 | B2 | 8/2019 | Kondrad et al. | |
| 2005/0146844 | A1 * | 7/2005 | Hussaini | G11B 33/02 361/679.29 |
| 2008/0246320 | A1 * | 10/2008 | Chang | B60R 11/0229 297/217.3 |
| 2008/0292117 | A1 * | 11/2008 | Guenther | H04R 1/2807 381/150 |
| 2014/0355783 | A1 * | 12/2014 | Subat | H04R 5/023 381/86 |
| 2017/0008434 | A1 * | 1/2017 | Chang | B60N 2/879 |
| 2017/0080876 | A1 * | 3/2017 | Chang | B60R 11/0235 |

* cited by examiner

US 11,351,898 B2

1

ACCESSORY SUPPORT ASSEMBLY FOR A VEHICLE SEAT

FIELD OF THE DISCLOSURE

The present disclosure generally relates to an accessory support assembly, and more specifically, the present disclosure relates to an accessory support assembly for a vehicle seating assembly.

BACKGROUND OF THE DISCLOSURE

Passengers of a vehicle may have information conveyed to them. Vehicles may have various components that convey information to the passengers. Additionally, vehicles may have features to improve the comfort level of the passenger.

SUMMARY OF THE DISCLOSURE

According to at least one aspect of the present disclosure, a vehicle seating assembly includes a seatback frame that has a cross member. A headrest assembly includes support features operably coupled to the cross member. The headrest assembly includes a cross bracket that extends between the support features. A support frame is coupled to the cross bracket of the headrest assembly and the cross member of the seatback frame. The support frame includes first and second side projections. A speaker assembly includes first and second speaker housings coupled to the first and second side projections of the support frame, respectively. The speaker assembly directs sound in a first direction. A shroud assembly at least partially extends over the support frame. A display is coupled to the shroud assembly. The display is disposed between the first and second speaker housings and is viewable from a second direction.

According to another aspect of the present disclosure, a seat for a vehicle includes a seatback frame that has a cross member. A headrest assembly is operably coupled to the seatback frame. The headrest assembly includes a cross bracket. A support frame is coupled to the cross bracket and the cross member. The support frame defines side projections. An angled edge of each side projection is disposed proximate a top of the cross member. A speaker assembly is coupled to the angled edge of at least one of the side projections of the support frame. The speaker assembly extends at least partially over the top of the cross member.

According to another aspect of the present disclosure, an accessory support assembly for a vehicle seat includes a support frame that includes an upper bracket and a lower bracket coupled to a bottom of the upper bracket. The lower bracket includes coupling features. The lower bracket defines side projections that extend from opposing sides of the support frame. A speaker assembly is coupled to the support frame. The speaker assembly includes a first speaker housing and a second speaker housing. The first and second speaker housings are coupled to the side projections of the support frame, respectively. A speaker is disposed in each of the first and second housings.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the presently disclosed device will be set forth in the detailed description which follows and will be apparent to those skilled in the art from the description, or recognized by practicing the device as described in the following description, together with the claims and appended drawings.

Figure 1:
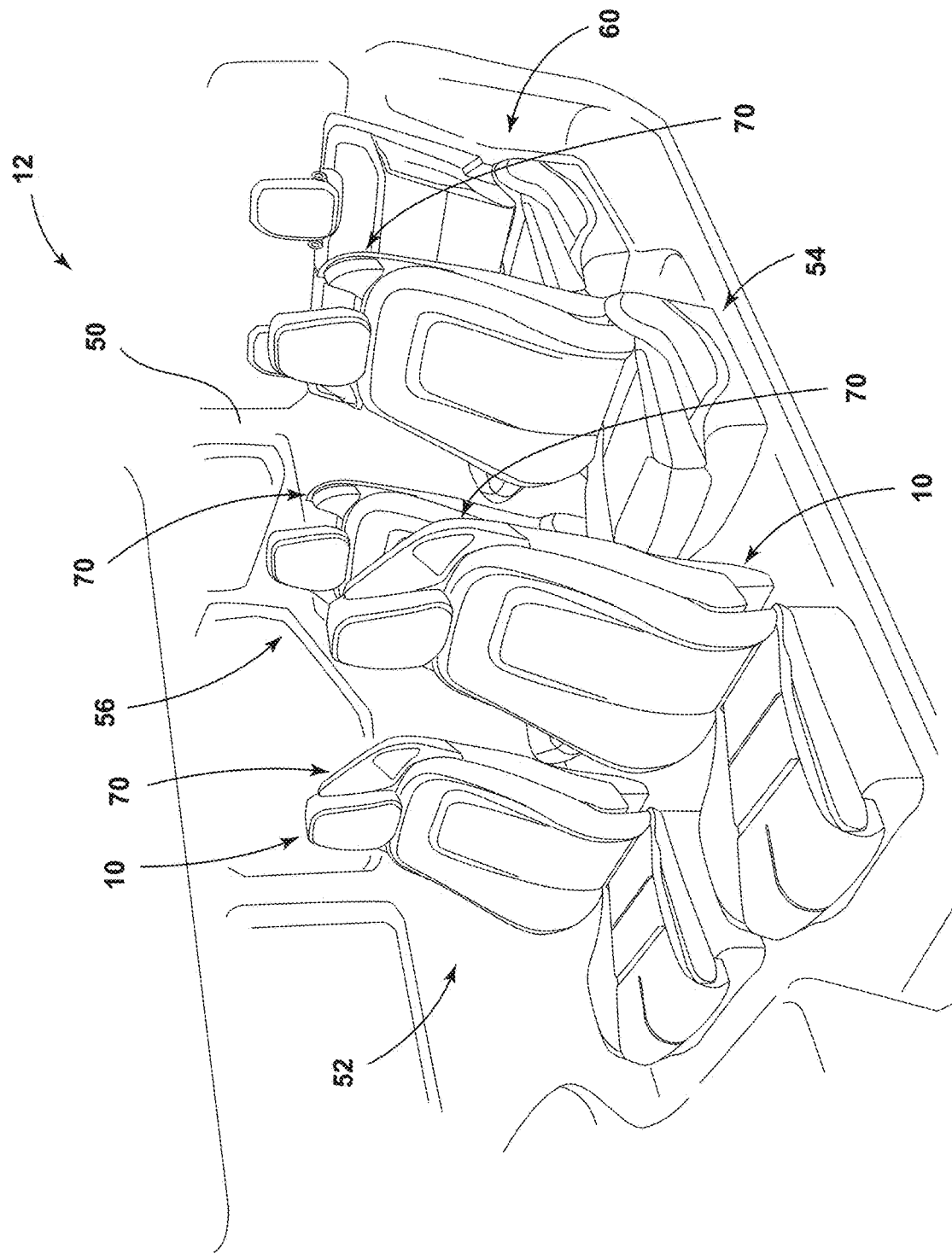
FIG. 1 is a partial front perspective view of an interior compartment of a vehicle, according to the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-17, reference numeral 10 generally designates a seating assembly for a vehicle 12 that includes a seatback frame 14 that has a cross member 16. A headrest assembly 18 includes support features 20 operably coupled with the cross member 16 of the seatback frame 14. The headrest assembly 18 includes a cross bracket 22 that extends between the support features 20. A support frame 24 is coupled to the cross bracket 22 of the headrest assembly 18 and the cross member 16 of the seatback frame 14. The support frame 24 includes first and second side projections 26, 28. A speaker assembly 30 includes first and second speaker housings 32, 34 coupled to the first and second side projections 26, 28 of the support frame 24, respectively. The speaker assembly 30 directs audio in a first direction. A shroud assembly 36 at least partially extends over the support frame 24. A display 38 is coupled to the shroud assembly 36. The display 38 is disposed between the first and second speaker housings 32, 34 and is viewable from a second direction.

Figure 2:
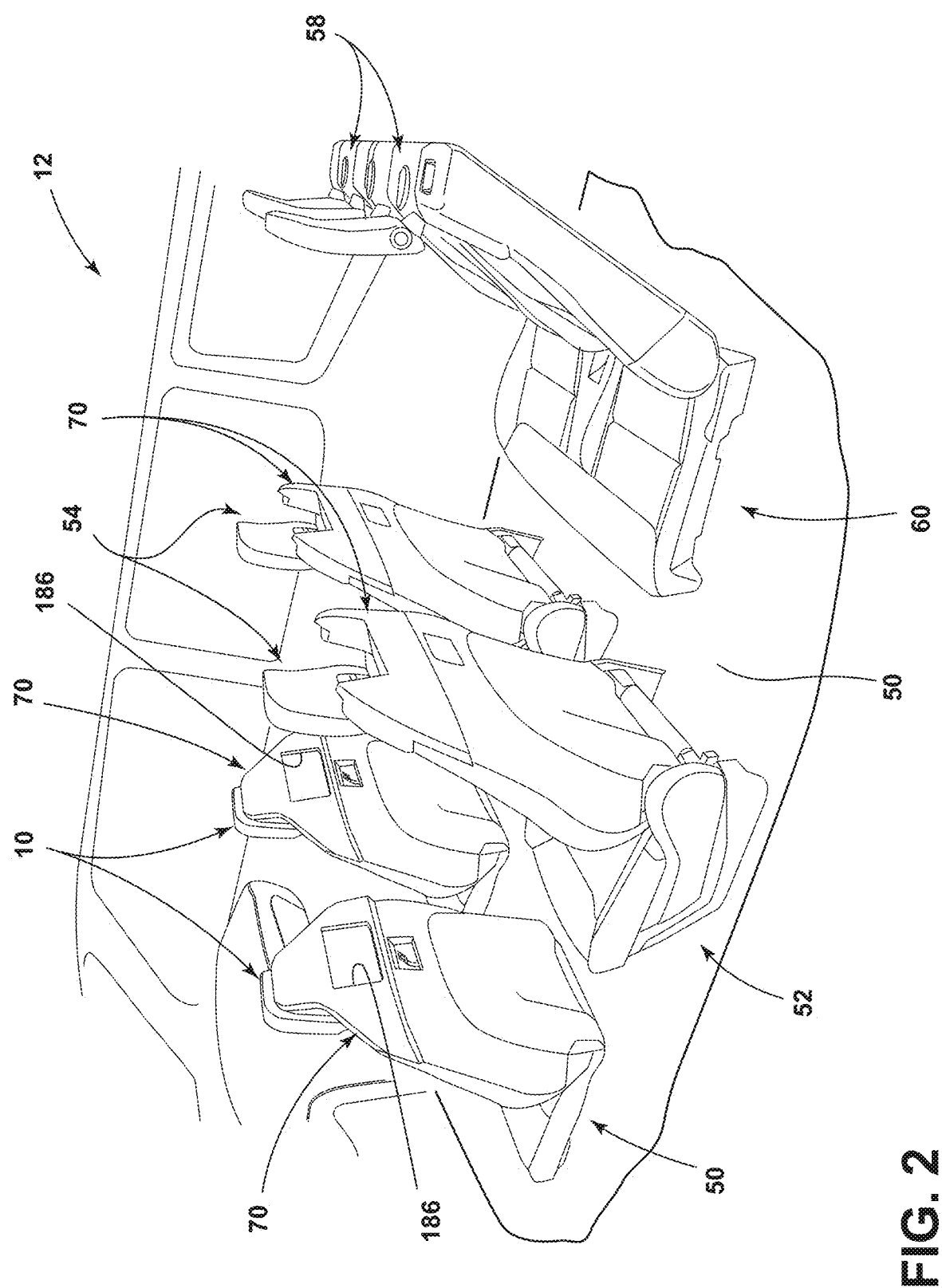
FIG. 2 is a partial side perspective view of an interior compartment of a vehicle, according to the present disclosure.

Referring to FIGS. 1 and 2, an interior compartment 50 of the vehicle 12 includes two seating assemblies 10 disposed in a first seating row 52, two seating assemblies 54 disposed in a second seating row 56, and two seating assemblies 58 disposed in a third seating row 60. One or more of the seating assemblies 10, 54, 58 may include an accessory support assembly 70. The accessory support assembly 70 may include the speaker assembly 30, the display 38, a massage assembly 44 (FIG. 4), or a combination thereof. In the illustrated configuration, the seating assemblies 10 in the first seating row 52 include the accessory support assembly 70 with at least the speaker assembly 30 and the display 38. The seating assemblies 54 in the second seating row 56 each include the accessory support assembly 70 having at least the speaker assembly 30. The seating assemblies 58 in the third seating row 60 may include the accessory support assembly 70 with the massage assembly 44, or may not include the accessory support assembly 70. It is contemplated that any of the seating assemblies 10, 54, 58 may include any variation of the accessory support assembly 70, or may not include the accessory support assembly 70, without departing from the teachings herein.

Each of the seating assemblies 10, 54 that include the speaker assembly 30 provide personalized audio for the passenger of the respective seating assembly 10, 54. The speaker assembly 30 may be advantageous for providing a surround sound effect to certain passengers while minimizing the effect the audio has on other passengers within the vehicle 12. The display 38 included in the seating assemblies 10 is viewable by the passengers in the seating assemblies 54. Accordingly, each of the seating assemblies 54 is disposed substantially directly behind one of the seating assemblies 10 to optimize viewing of the display 38. The seating assemblies 58 in the third seating row 60 are offset from the seating assemblies 54 in the second seating row 56, which do not include the display 38. The accessory support assembly 70 may provide audio and/or visual information to passengers in specific areas of the vehicle 12, providing personalized communication and entertainment.

The vehicle 12 may be a sedan, a sport-utility vehicle, a van, a truck, a crossover, or other styles of vehicle 12. In various examples, the vehicle 12 may be a manually operated vehicle 12 (e.g., with a human driver), a fully autonomous vehicle 12 (e.g., operated with no human driver), or a partially autonomous vehicle 12 (e.g., operated with or without a human driver). Additionally, the vehicle 12 may be utilized for personal or commercial purposes, such as, for ride-providing services (e.g., chauffeuring) or ride-sharing services.

Figure 4:
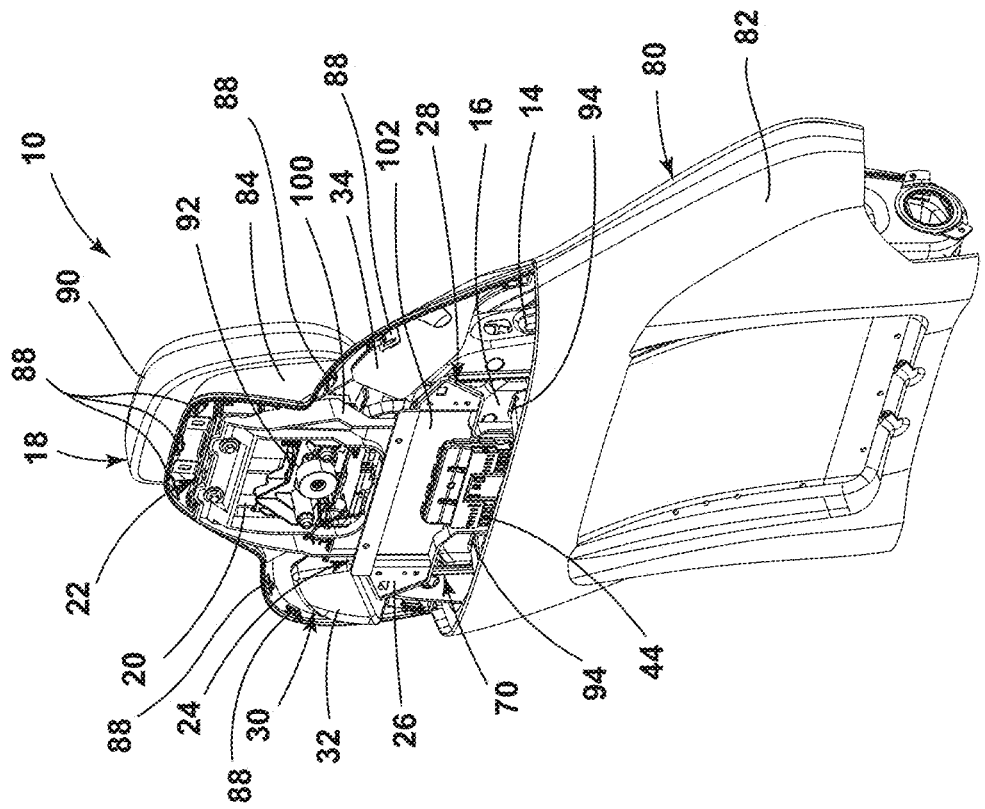
FIG. 4 is a rear perspective view of the seatback of FIG. 3 with a rear shroud cover removed.
Figure 3:
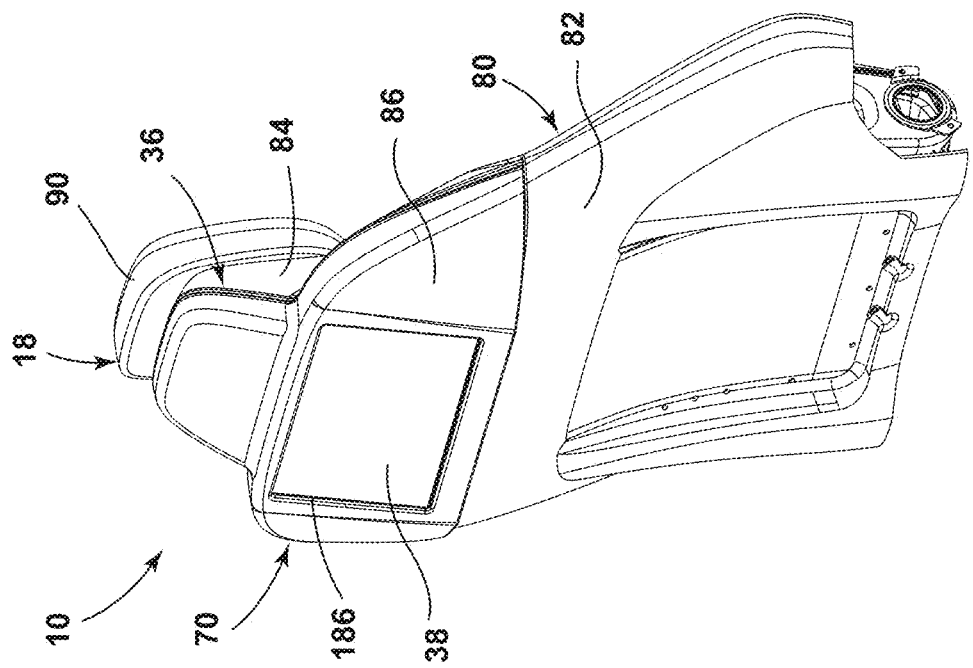
FIG. 3 is a rear perspective view of a seatback of a vehicle seating assembly, according to the present disclosure.

Referring to FIGS. 3 and 4, the seating assembly 10 is described in detail, however, it is contemplated that some or all of the below description may also apply to one or both of the seating assemblies 54, 58. Each seating assembly 10 includes a seatback 80 that includes the seatback frame 14, the shroud assembly 36, and a trim feature 82. The shroud assembly 36 is disposed around an upper portion of the seatback frame 14 and at least a portion of the headrest assembly 18. Generally, the shroud assembly 36 includes a first shroud cover 84 disposed on a first side (e.g., a vehicle-forward side) of the seating assembly 10 and a second shroud cover 86 disposed on a second side (e.g., a vehicle-rearward side) of the seating the assembly 10. The first and second shroud covers 84, 86 generally include mating connectors 88, such that the first shroud cover 84 is coupled to the second shroud cover 86 around a portion of the headrest assembly 18 and a portion of the seatback frame 14.

Additionally, the shroud assembly 36 extends over a portion of the support frame 24 that extends between the headrest assembly 18 and the seatback frame 14. The shroud assembly 36 extends around the display 38 and the speaker assembly 30 to form an integrated appearance of the accessory support assembly 70 with the seating assembly 10. Based on the configuration of the accessory support assembly 70 (e.g., with the display 38, the speaker assembly 30, the massage assembly 44, or a combination thereof), the shroud assembly 36 may have a different configuration, as best illustrated on the seating assemblies 10, 54 in FIGS. 1 and 2.

Referring still to FIGS. 3 and 4, the shroud assembly 36 extends from the trim feature 82 toward a top of a headrest 90 of the headrest assembly 18. According to various aspects, the headrest assembly 18 may be a powered headrest. In such configurations, the headrest assembly 18 may include a motorized adjustment assembly 92 operably coupled to the headrest 90 and the cross member 16 of the seatback frame 14. The shroud assembly 36 generally obscures the motorized adjustment assembly 92 from the view of the passengers within the vehicle 12. The headrest 90 is disposed adjacent to an outer surface of the first cover shroud 84 and the motorized adjustment assembly 92 extends through the first shroud cover 84 to engage the headrest 90.

The seatback 80 also includes the trim feature 82, which is illustrated on the vehicle rearward-side of the seating assembly 10 vertically below the second shroud cover 86. The trim feature 82 is generally a rigid structure, which may be formed of plastic materials. The trim feature 82, as best illustrated in FIG. 4, includes hooks 94 that extend through apertures defined by the cross member 16 of the seatback frame 14. The hooks 94 are configured to retain the trim feature 82 in the selected position relative to the seatback frame 14. It is also contemplated that the trim feature 82 may have other configurations. For example, the trim feature 82 may be a flexible material such as a cover stock.

The support frame 24 extends between the headrest assembly 18 and the cross member 16 on the vehicle-rearward side of the seating assembly 10. The shroud assembly 36 extends over a substantial portion of the support frame 24 and the trim feature 82 extends over the remainder of the support frame 24. The support frame 24 extends below the apertures defined by the cross member 16 in which the hooks 94 of the trim feature 82 are inserted. Accordingly, a width of the support frame 24 narrows to allow the support frame 24 to extend between the hooks 94 of the trim feature 82.

Figure 5:
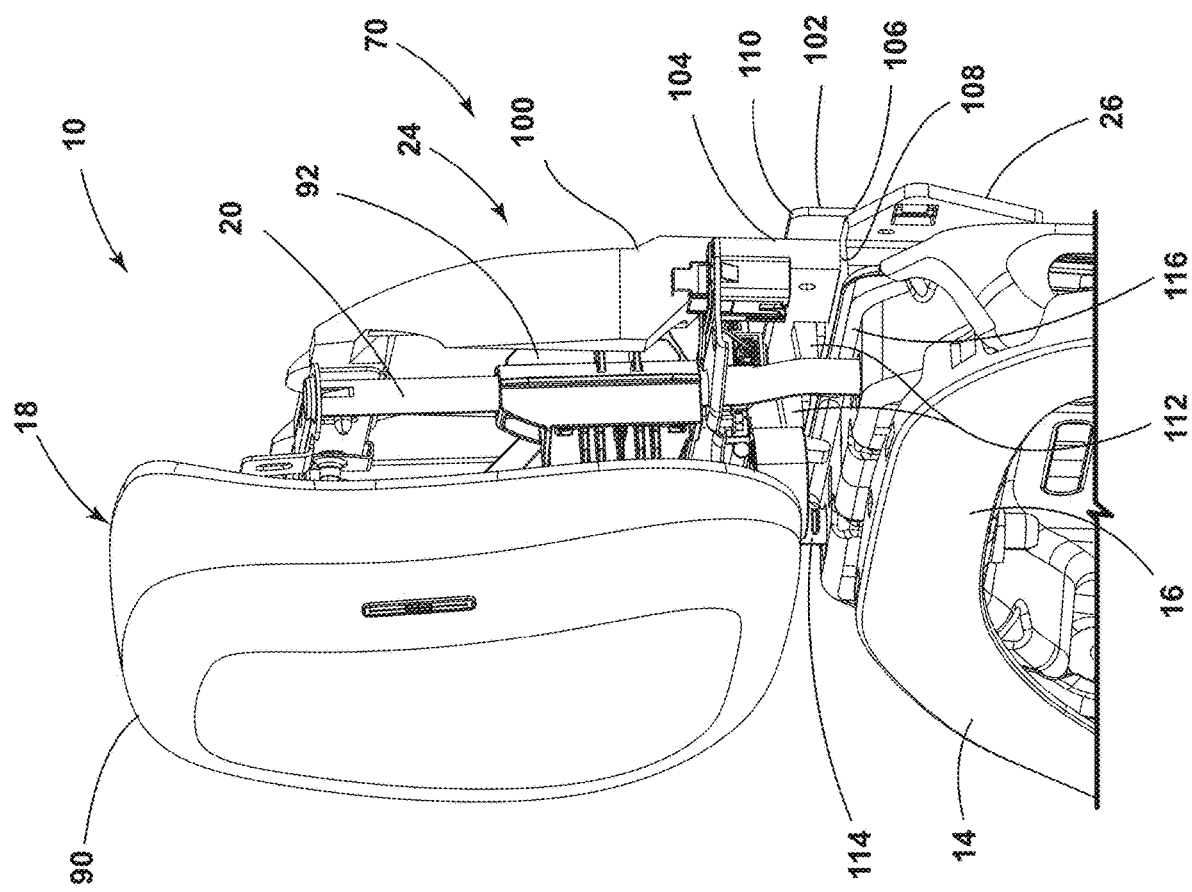
FIG. 5 is a side perspective view of a headrest assembly and a support frame coupled to a vehicle seating assembly, according to the present disclosure.
Figure 6:
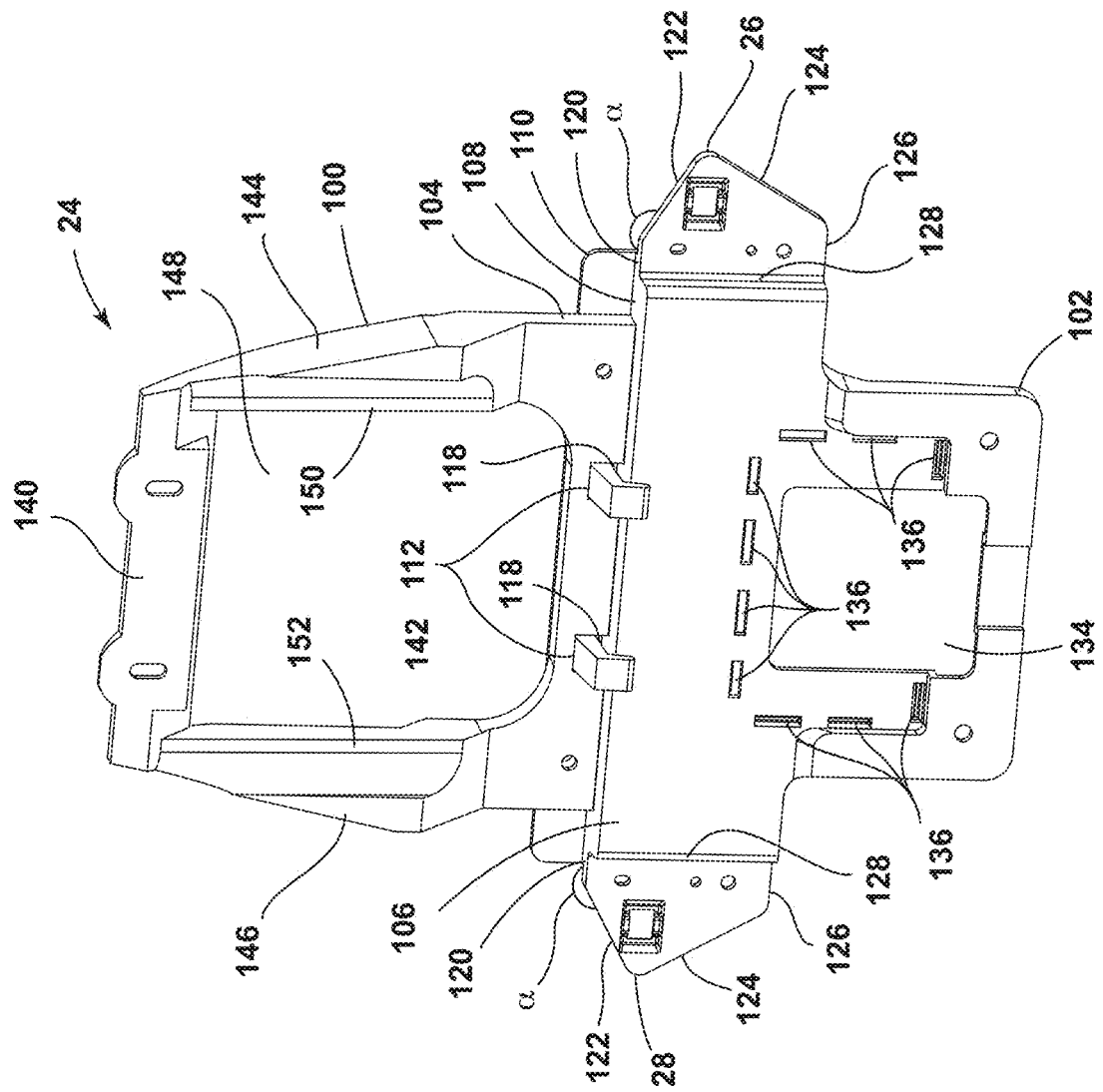
FIG. 6 is a rear perspective view of a support frame for an accessory support assembly, according to the present disclosure.

Referring to FIGS. 5 and 6, the support frame 24 includes an upper bracket 100 and a lower bracket 102. The upper bracket 100 generally extends adjacent to the headrest assembly 18 and the lower bracket 102 generally extends adjacent to the cross member 16 of the seatback frame 14. A bottom 104 of the upper bracket is coupled to a top 106 of the lower bracket 102. The top 106 of the lower bracket 102 includes a ledge 108 and a flange 110 extending vertically from the ledge 108. The bottom 104 of the upper bracket 100 is positioned on the ledge 108 and abuts the flange 110. The ledge 108 and the flange 110 may assist in properly aligning the upper bracket 100 relative to the lower bracket 102. Additionally or alternatively, a fastener or other coupling member may couple the flange 110 to the upper bracket 100.

The lower bracket 102 defines hooks 112 extending from the flange 110. The hooks 112 extend over the ledge 108 and extend beyond an edge of the ledge 108 to engage the cross member 16 of the seatback frame 14. A top 114 of the cross member 16 includes a ridge 116. Generally, the ridge 116 is defined on a vehicle-reward edge of the top 114 of the cross member 16. The hooks 112 extend from the lower bracket 102 and engage the ridge 116 to assist in retaining the support frame 24 to the seatback frame 14. Accordingly, the top 106 of the lower bracket 102 and the bottom 104 of the upper bracket 100 are generally aligned with the top 114 of the cross member 16. Additionally or alternatively, the bottom 104 of the upper bracket 100 defines notches 118 for the hooks 112 to extend through to engage the ridge 116. The hooks 112 and the notches 118 assist in preventing lateral movement between the upper bracket 100 and the lower bracket 102.

Figure 7:
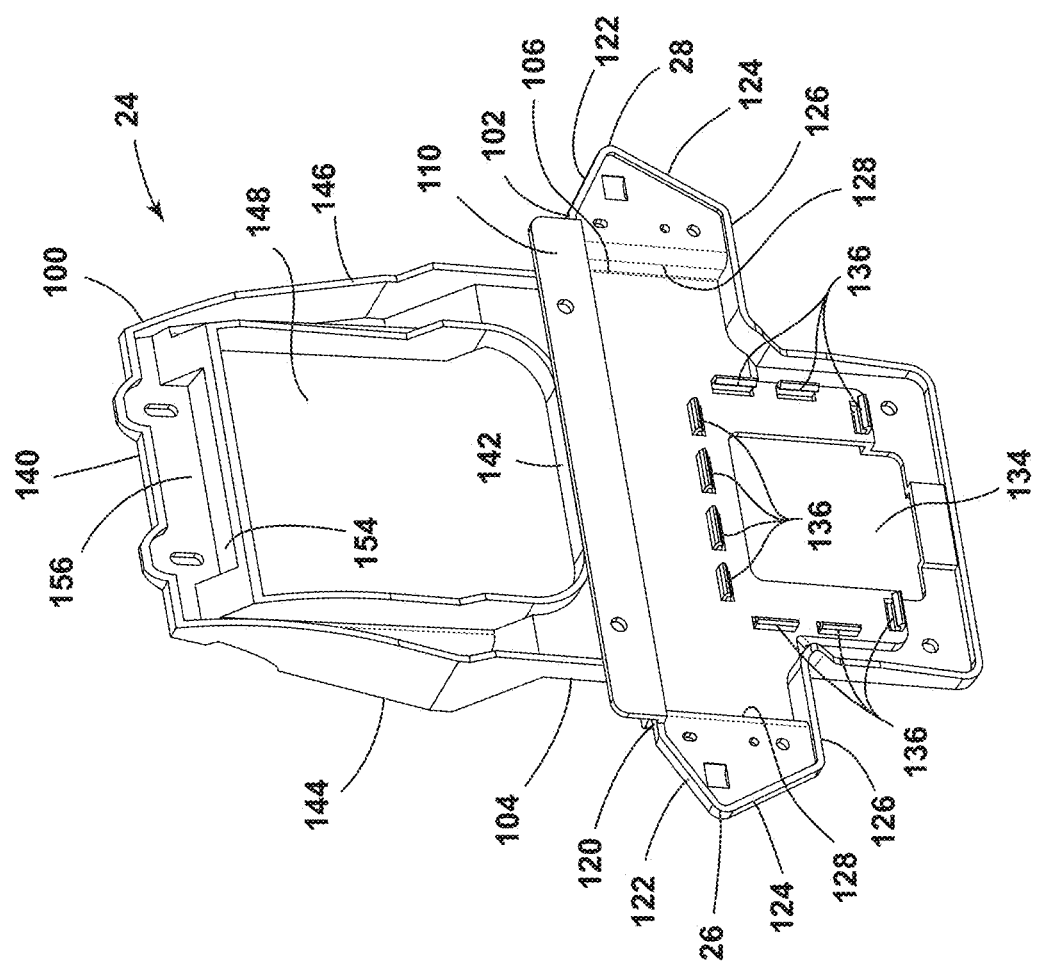
FIG. 7 is a front perspective view of the support frame of FIG. 6.

Referring still to FIGS. 5 and 6, as well as FIG. 7, the ledge 108 of the lower bracket 102 has a width greater than the width of the bottom 104 of the upper bracket 100. The lower bracket 102 includes the first and second side projections 26, 28. The first and second side projections 26, 28 are disposed below the ledge and extend outward in opposing directions. The first side projection 26 is generally a mirror image of the second side projection 28. In the illustrated configuration, the first and second side projections 26, 28 each have a generally pentagonal shape. Accordingly, the first and second side projections 26, 28 each include a first edge 120 that extends outward from the ledge 108 adjacent to the flange 110 and extends along the same or a substantially similar plane as the ledge 108. A second edge 122 extends from the first edge 120 at an obtuse angle α relative to the first edge 120. The second edge 122 extends outward and downward, away from the upper bracket 100. Additionally, each second edge 122 is generally aligned with a sloped side portion of the top 114 of the cross member 16.

A third edge 124 of each of the first and second side projections 26, 28 extends from the respective second edge 122. The third edge 124 extends downward and at an inward angle toward the remainder of the lower bracket 102. A fourth edge 126 extends from the third edge 124 and generally parallel to the first edge 120. A fifth edge 128 extends between the first edge 120 and fourth edge 126 and is coupled to the remainder of the lower bracket 102. The configuration of the first and second side projections 26, 28 may be utilized to properly position and align the speaker assembly 30 for optimizing sound quality and the surround sound effect of the speaker assembly 30. The configuration of each of the first and second side projections 26, 28 may differ based on the configuration of the seating assembly 10 and the speaker assembly 30.

The lower bracket 102 defines an opening 134 disposed partially below the first and second side projections 26, 28. Coupling features 136 are disposed around a portion, or the entire, perimeter of the opening 134. The coupling features 136 may be curved projections or snap features that elastically deform to retain the massage assembly 44 (FIG. 4) to the support frame 24. It is contemplated that any configuration of the coupling features 136 may be utilized to retain the massage assembly 44 to the support frame 24 without departing from the teachings herein. The massage assembly 44 may include a control unit for controlling a massage function of the seating assembly 10. Wiring or other electrical connectors may extend from the massage assembly 44 to various locations within the seating assembly 10. The support frame 24 provides a convenient and centralized location on the seating assembly 10 to support the massage assembly 44.

Referring still to FIGS. 5-7, the lower bracket 102 extends from the top 114 of the cross member 16 to a bottom edge of the cross member 16. The upper bracket 100 extends vertically from the lower bracket 102, adjacent to the headrest assembly 18, and toward a top of the shroud assembly 36. The headrest assembly 18 includes the support features 20 arranged generally parallel and on opposing sides of the headrest 90. The upper bracket 100 is generally sized and shaped to provide space for the headrest assembly 18. The upper bracket 100 includes upper and lower coupling members 140, 142 in a generally parallel arrangement. Lateral supports 144, 146 extend between the upper and lower coupling members 140, 142 and are arranged in a generally parallel configuration. The upper and lower coupling members 140, 142 and the lateral supports 144, 146 define an aperture 148, which provides a space for the motorized adjustment assembly 92, as well as other features of the headrest assembly 18. The lateral supports 144, 146 each define a groove 150, 152 for providing space for the support features 20 of the headrest assembly 18. The groove 150 of the lateral support 144 is a mirror image of the groove 152 of the lateral support 146. The lateral supports 144, 146 generally taper in depth from an end coupled to the lower coupling member 142 to an opposing end coupled to the upper coupling member 140, which may be advantageous for minimizing interference with the shroud assembly 36.

Figure 8:
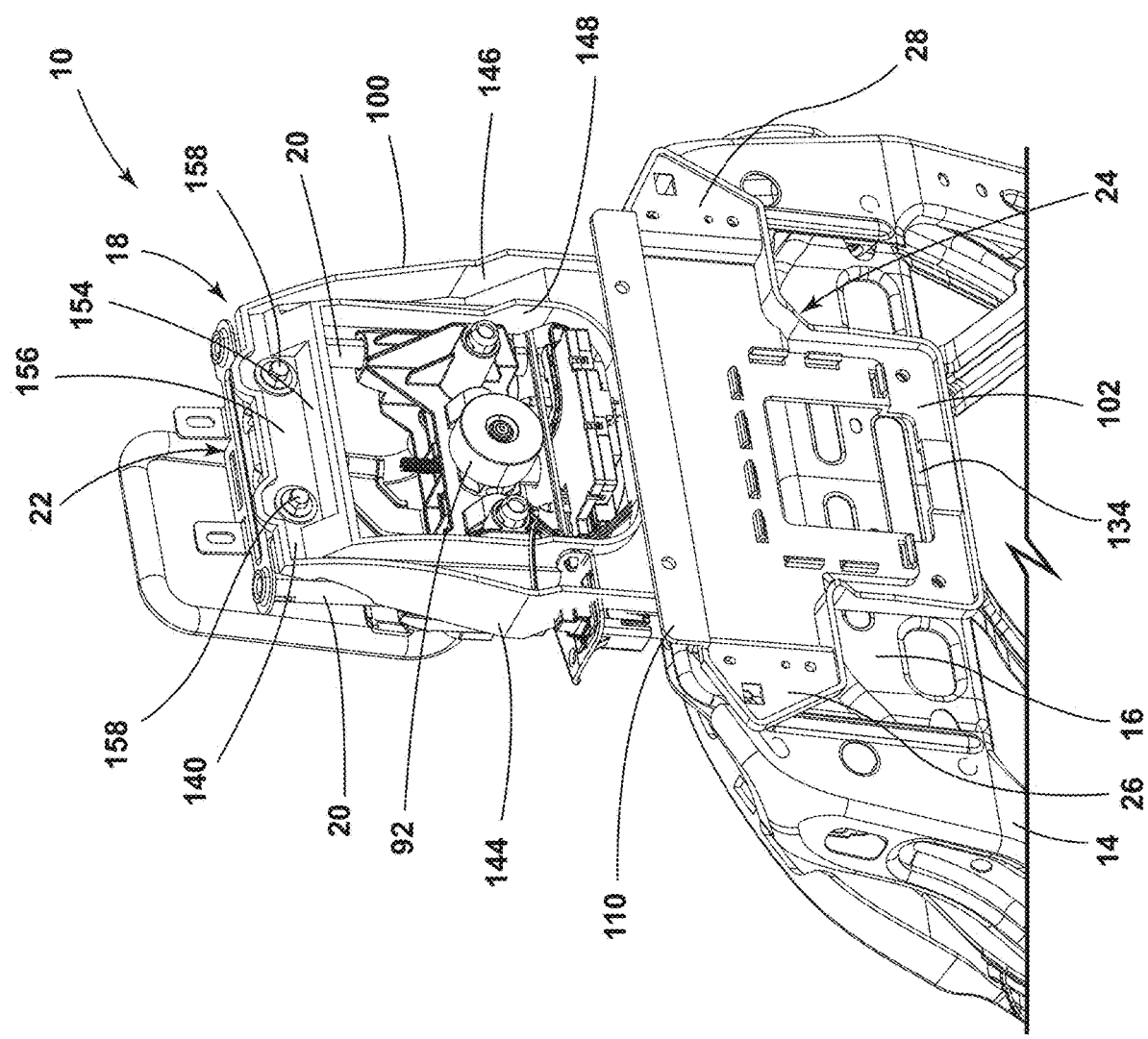
FIG. 8 is a front perspective view of a support frame of an accessory support assembly coupled to a rear side of a headrest assembly and a seatback frame, according to the present disclosure.
Figure 9:
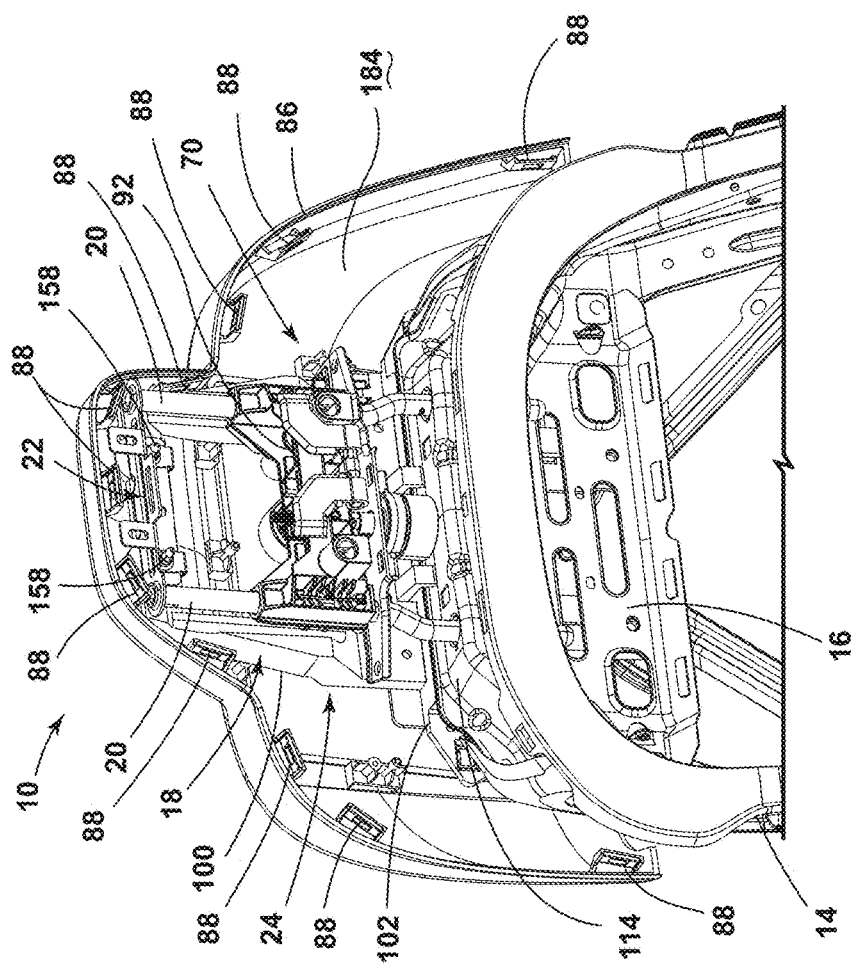
FIG. 9 is a front perspective view of a headrest assembly with a rear shroud cover coupled thereto, according to the present disclosure.
Figure 10:
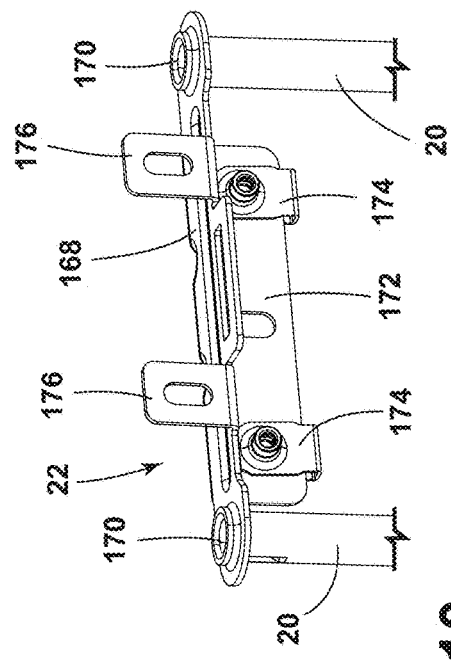
FIG. 10 is a front perspective view of a cross bracket coupled to headrest supports, according to the present disclosure.

Referring to FIGS. 8-10, the upper coupling member 140 includes a platform 154 and a coupling flange 156 that extends vertically from the platform 154. The upper coupling member 140 of the upper bracket 100 couples to the cross bracket 22 of the headrest assembly 18. The platform 154 and the coupling flange 156 define a space for fasteners 158 that couple the upper bracket 100 to the cross bracket 22. The space for the fasteners 158 may be advantageous for minimizing or preventing interference between the fasteners 158 and the shroud assembly 36.

The headrest assembly 18 includes the cross bracket 22 extending between the support features 20. Generally, the cross bracket 22 is coupled to tops of the support features 20 adjacent to a top of the second shroud cover 86. Additionally or alternatively, the cross bracket 22 includes a support coupling plate 168 that extends between the support features 20 of the headrest assembly 18. The support coupling plate 168 defines apertures 170 to receive the support features 20. The support coupling plate 168 may define rims surrounding the apertures 170, which may assist in aligning the support features 20 with the apertures 170. It is contemplated that the rims, extending vertically from the support coupling plate 168, may have inconsistent diameters or widths to retain the cross bracket 22 on the tops of support features 20. Alternatively, the support coupling plate 168 may include indents or grooves sized and shaped to receive the support features 20.

A bracket coupling plate 172 of the cross bracket 22 extends vertically from the support coupling plate 168 and abuts the coupling flange 156 of the upper bracket 100. The cross bracket 22 may include coupling supports 174 coupled to the bracket coupling plate 172. The coupling supports 174 may secure the fasteners 158 and support the engagement between the coupling flange 156 and the bracket coupling plate 172. The engagement between the cross bracket 22 and the upper bracket 100 provides an upper support to the support frame 24 and a structural connection between the accessory support assembly 70 and the headrest assembly 18. The cross bracket 22 may also include additional flanges 176 extending vertically from the support coupling plate 168 on an opposing side relative to the bracket coupling plate 172. The additional flanges 176 may provide additional support or coupling points to the cross bracket 22. The additional flanges 176 extend vertically in a direction opposite the bracket coupling plate 172.

Figure 11:
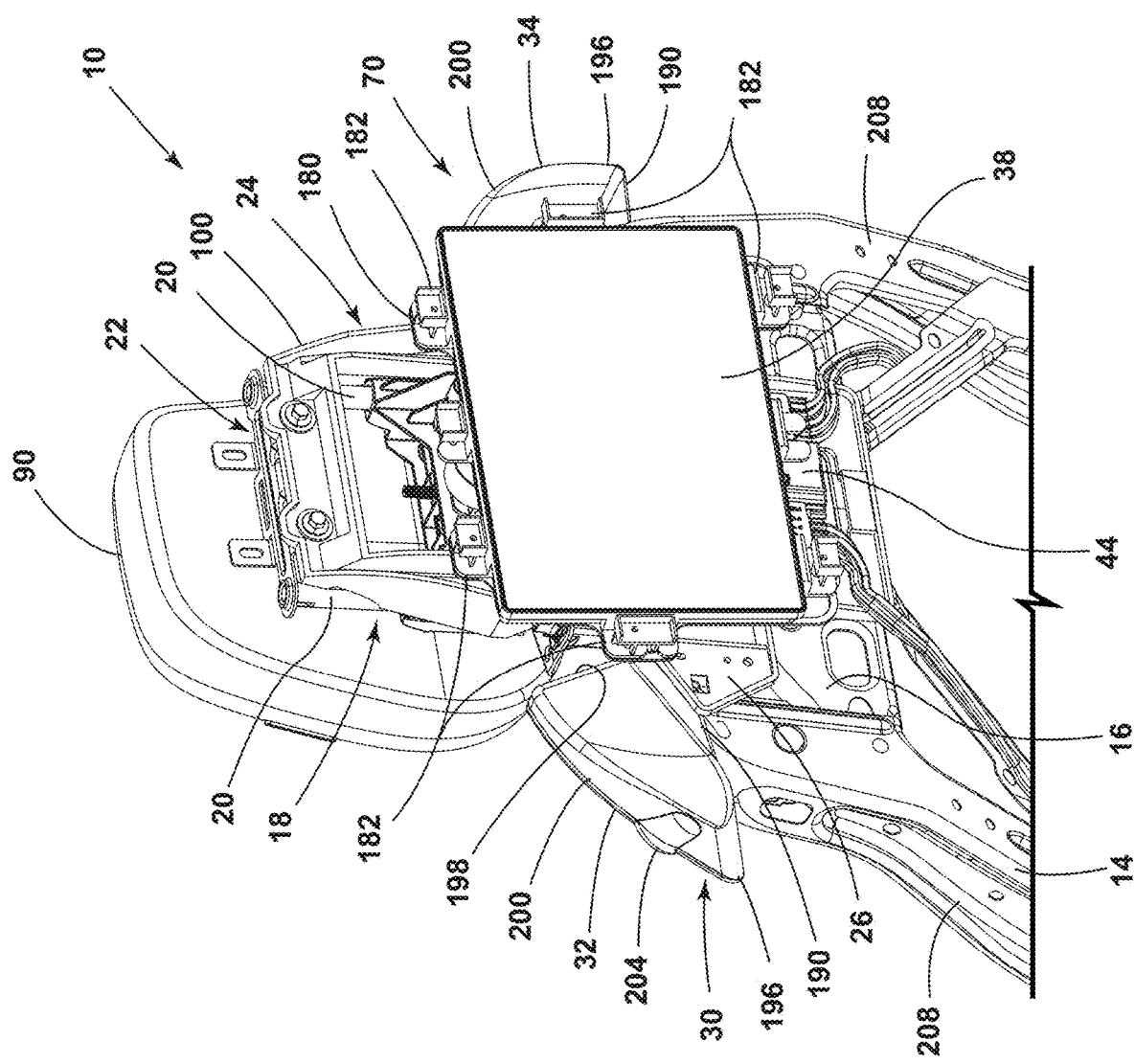
FIG. 11 is a front perspective view of a vehicle accessory support assembly with a display and a speaker assembly, according to the present disclosure.

Referring to FIG. 11, the accessory support assembly 70 includes the display 38 positioned adjacent to the support frame 24. The display 38 is generally positioned between the first and second side projections 26, 28 of the support frame 24. The display 38 also extends between the upper bracket 100 and the lower bracket 102 and at least partially over the coupling features 136 and the massage assembly 44. The display 38 is generally coupled to a housing 180 that extends around a perimeter of the display 38. The housing 180 may have flanges or extensions that include connectors 182. Generally, the connectors 182 engage corresponding or mating connectors defined on an inner surface 184 (FIG. 9) of the second shroud cover 86. As the display 38 is coupled to the inner surface 184, the second shroud cover 86 defines a display opening 186, as best illustrated in FIGS. 2 and 3, which aligns with the display 38 to allow optimal viewing of the display 38. It is contemplated that the display 38 may not have a direct mechanical connection to the support frame 24. Alternatively, the support frame 24 may include locating tabs for properly positioning the display 38 to optimize viewing of the display by passengers in the seating assemblies 54. The display 38 may have any practicable configuration. Additionally or alternatively, electrical connectors for the display 38 may extend through the support frame 24 and the seating assembly 10 to engage a power source. The display 38 may also be communicatively coupled to other electronic devices through wired or wireless communication.

Figure 12:
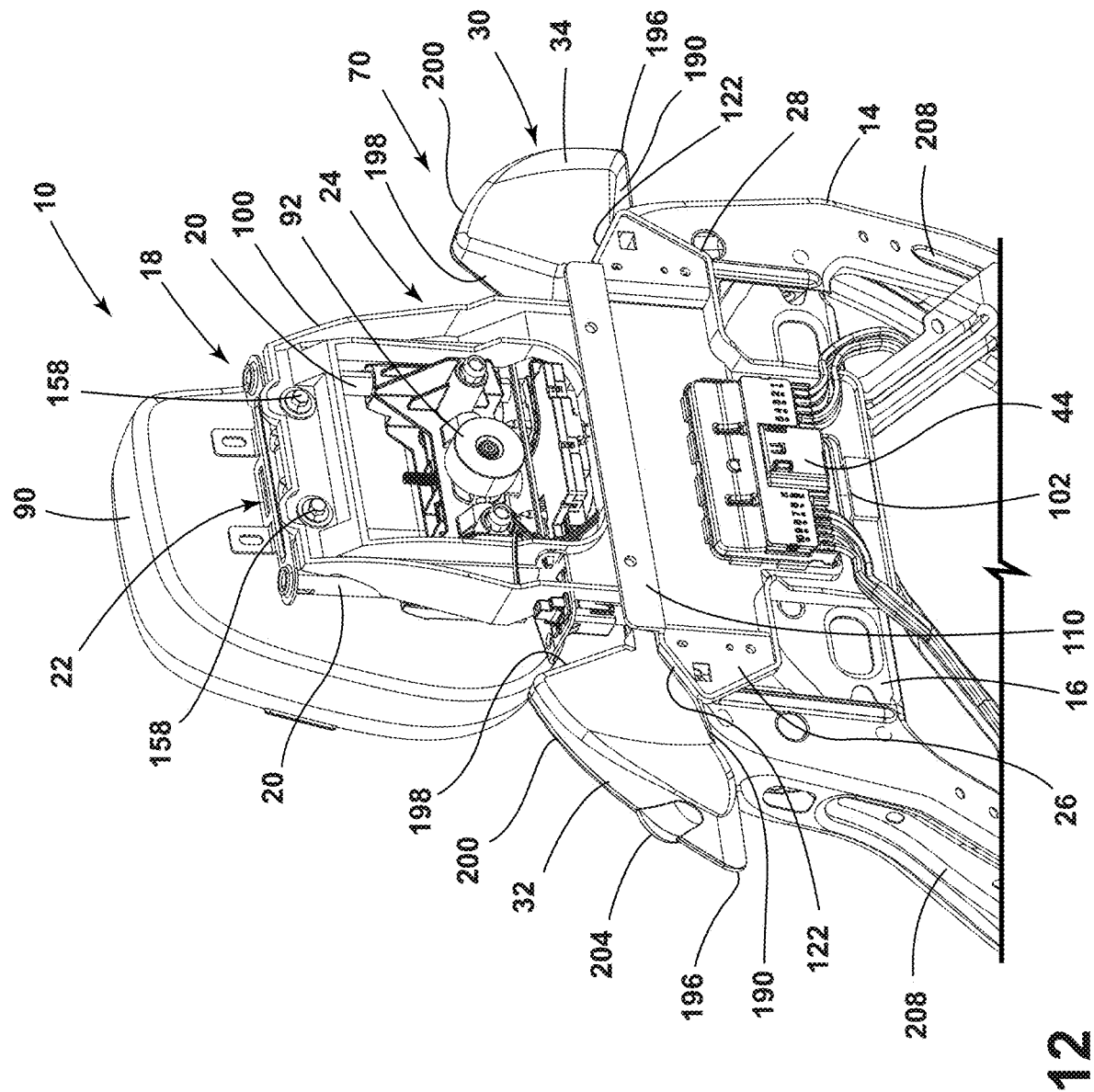
FIG. 12 is a front perspective view of the vehicle accessory support assembly of FIG. 11 with the display removed.
Figure 13:
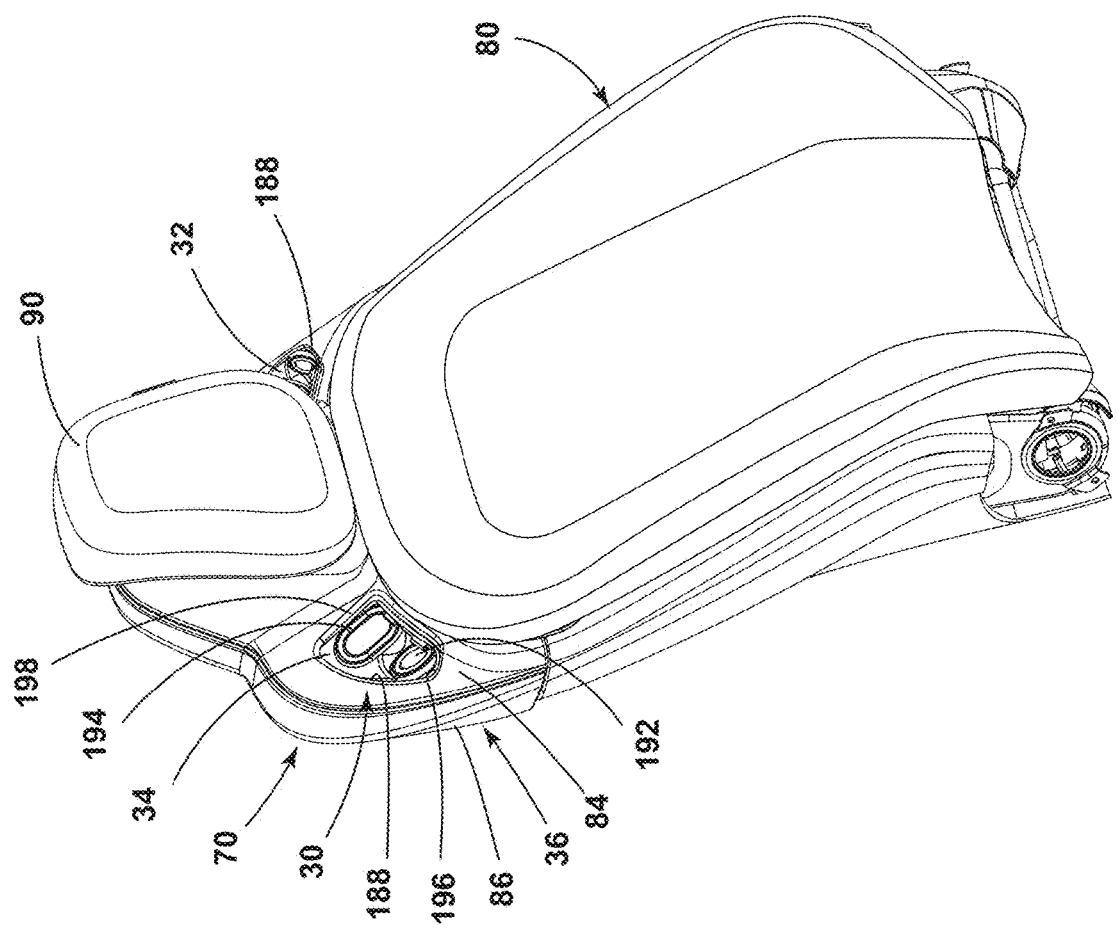
FIG. 13 is a front perspective view of a seatback with a speaker assembly, according to the present disclosure.
Figure 14:
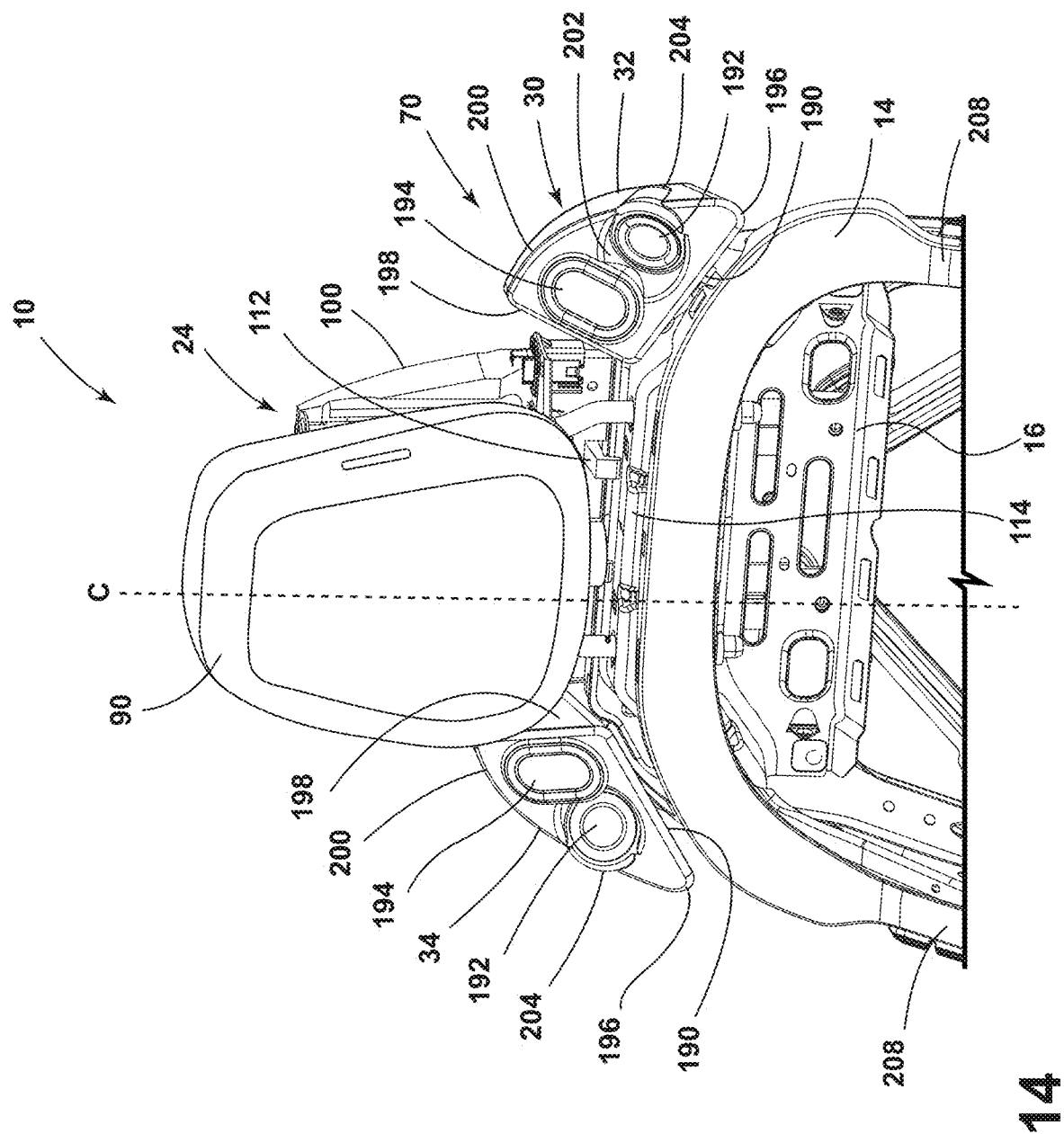
FIG. 14 is a front perspective view of a headrest assembly with a speaker assembly disposed on each side of the headrest assembly, according to the present disclosure.

Referring to FIGS. 12-14, the support frame 24 operates to position and support the speaker assembly 30 of the accessory support assembly 70. As previously stated, the speaker assembly 30 includes the first speaker housing 32 and the second speaker housing 34. The first speaker housing 32 is coupled to the first side projection 26 of the support frame 24, and the second speaker housing 34 is coupled to the second side projection 28. Accordingly, the speaker assembly 30 is coupled to opposing sides of the support frame 24 which generally aligns to both right and left sides of the passenger disposed on the seating assembly 10.

The first shroud cover 84 defines speaker openings 188 that align with the first and second speaker housings of 32, 34. The speaker openings 188 are disposed on opposing sides of the headrest 90 on the vehicle-forward side of the seating assembly 10. The size and shape of the speaker openings 188 generally correspond with the size and shape of the first and second speaker housings 32, 34 to optimize the audio projected by the speaker assembly 30.

A bottom 190 of each of the first and second speaker housings 32, 34 is coupled to the second edge 122 of the respective first and second side projection 26, 28. The first and second speaker housings 32, 34 may be oriented at a same or substantially similar angle as the obtuse angle α of the second edge 122. The angle and positioning of the first and second speaker housings 32, 34 may properly position the speaker assembly 30 relative to the passenger on the seating assembly 10 to optimize the surround sound effect and the sound quality of the speaker assembly 30. It is contemplated that the first and second speaker housings 32, 34 may have coupling features for coupling to different locations of the support frame 24.

Each of the first and second speaker housings 32, 34 includes a speaker 192 and a passive radiator 194. In the illustrated configuration, the speaker 192 is disposed adjacent to a distal end 196 of the respective first and second speaker housing 32, 34, and the passive radiator 194 is disposed adjacent to a proximal end 198. The passive radiator 194 is generally powered by air pressure generated by the speaker 192. The passive radiator 194 may utilize sounds in the first and second speaker housings 32, 34 to excite a resonance that provides deeper pitches or baselines for the speaker assembly 30. The speaker 192 and the passive radiator 194 may have any practicable configuration to maximize sound quality.

The configuration of the first and second speaker housings 32, 34 may directly affect the sound quality and surround sound effect of the speaker assembly 30. In the illustrated configuration, the first and second speaker housings 32, 34 have a greater height at the proximal end 198 relative to the distal end 196. Accordingly, each of the first and second speaker housings 32, 34 tapers from the proximal end 198 to the distal end 196. Additionally or alternatively, a depth of each the first and second speaker housings 32, 34 increases from the proximal end 198 to the distal end 196. The depth may increases from a top 200 of each the first and second speaker housings 32, 34 to the bottom 190. This configuration provides an internal volume of each of the first and second speaker housings 32, 34 that optimizes the sound quality, as will be discussed in more detail below.

Each of the speakers 192 may be disposed at an angle within the respective first and second speaker housings 32, 34 to direct sound toward a centerline c of the seating assembly 10. The angled position of the speakers 192 optimizes the sound directed to the passenger in the seating assembly 10. The speakers 192 are generally setback from a front surface of each of the first and second speaker housings 32, 34. The speakers 192 are disposed within an indent 202 of the front surface, which may assist in directing the sound in the selected direction. Additionally, as the speakers 192 are disposed adjacent to the tapered distal ends 196, the top 200 of the first and second speaker housings 32, 34 may define a protrusion 204 to provide a space for the angled speakers 192. It is contemplated that the first speaker housing 32 is a mirror image of the second speaker housing 34.

The first and second speaker housings 32, 34 extends beyond the first and second side projections 26, 28 and over the top 114 of the cross member 16. The first and second speaker housings 32, 34 continue to extend over the curved side portion s of the top 114 and over a juncture between the cross member 16 and arms 208 of the seatback frame 14. The positioning of the first and second speaker housings 32, 34 may generally align with being disposed adjacent to the left and right shoulders of the passenger on the seating assembly 10. The obtuse angle α of the second edge 122 of each of the first and second side projections 26, 28 is generally the same angle as the sloped juncture between the top 114 of the cross member 16 of the seatback frame 14 to position the first and second speaker housings 32, 34. The first and second speaker housings 32, 34 extend in a vehicle-forward direction from the first and second side projections 26, 28 and extend over the top 114 of the cross member 16 and may extend beyond the arms 208 of the seatback frame 14.

Figure 15:
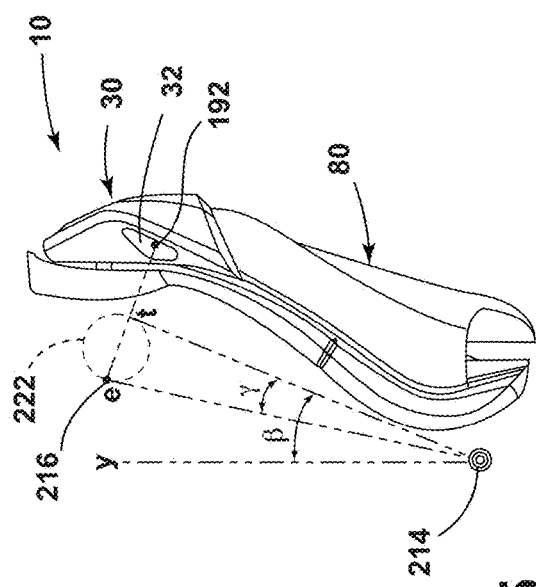
FIG. 15 is a schematic diagram of an ear height relative to a speaker assembly in a seatback, according to the present disclosure.
Figure 17:
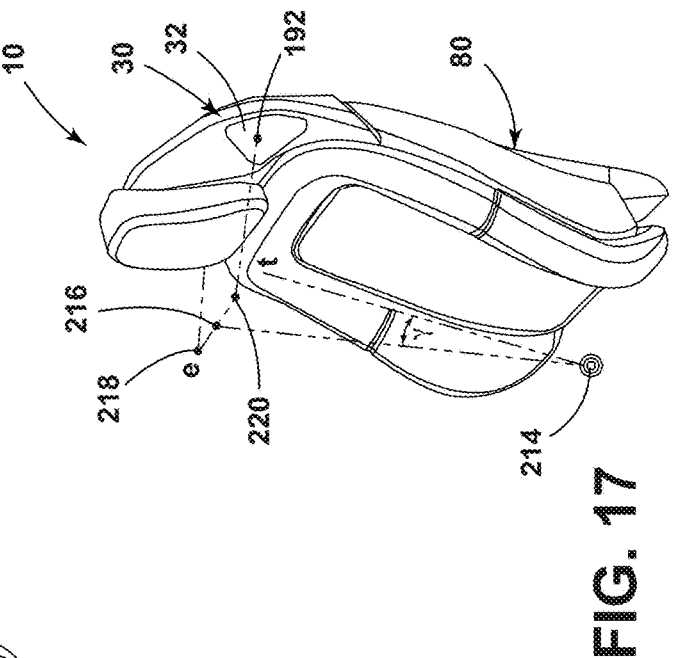
FIG. 17 is a schematic diagram of the ear width points of FIG. 16 relative to adjacent speakers coupled to the seatback.
Figure 16:
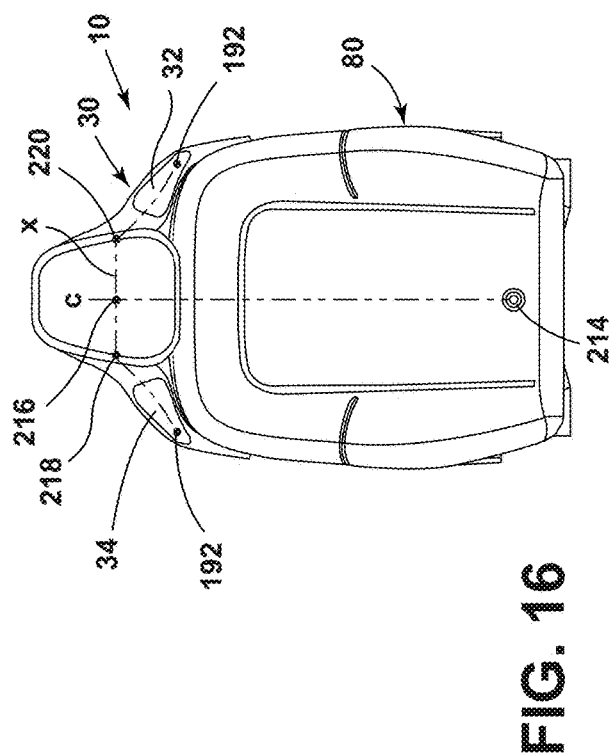
FIG. 16 is a schematic diagram of an ear width points relative to a centerline of a seatback and a speaker assembly coupled to the seatback at the ear height of FIG. 15.

Referring to FIGS. 15-17, as previously stated, the size, shape, and positioning of the first and second speaker housings 32, 34 and the speakers 192 directly affect the sound quality and the surround sound effect provided by the speaker assembly 30. The first and second speaker housings 32, 34 are coupled to the angled second edge 122 of the first and second side projections 26, 28, respectively. Each second edge 122 extends at the obtuse angle α relative to the first edge 120 and the ledge 108 to position the first and second speaker housings 32, 34 at the proper angled orientation. Further, the shape of the first and second speaker housings 32, 34 may optimize the interior volume of each of the first and second speaker housings 32, 34. The interior volume may be in a range from 160 cm$^3$ to about 180 cm$^3$. In certain aspects, the interior volume of each of the first and second speaker housings 32, 34 is about 170 cm$^3$, which may provide an optimized sound quality for the speaker assembly 30.

A RAMSIS manikin was utilized to determine the optimal position of the first and second speaker housings 32, 34 in the seatback 80. The RAMSIS manikin was designed to represent the 50th percentile for males in the United States. A point 214 represents a position of a hip of RAMSIS manikin (e.g., representative of the passenger) on the seating assembly 10. A vertical axis y extends through the hip point 214. The RAMSIS manikin was positioned at a torso angle θ of about 22° relative to the vertical axis y. The alignment of the torso is illustrated as line t in FIGS. 15 and 17. Utilizing the torso line t, an ear height position, represented by point 216 on an ear line e, was determined. The ear line e extends at an angle γ of about 12.1° degrees from the torso line t between the torso line t and the vertical axis y (e.g., in a direction away from the seatback 80). Using the RAMSIS manikin, the ear height point 216 was determined to be at a distance of about 633 mm from the hip point 214. However, the ear point 216 may be a distance in a range of from about 600 mm to about 650 mm from the hip point 214.

The ear height point 216 is disposed on the centerline c of the seating assembly 10.

Accordingly, the ear height point 216 is a midpoint between ear width points 218, 220. The ear width points 218, 220 illustrate the spacing of left and right ears of the RAMSIS manikin along a horizontal axis x, which generally extends laterally across the headrest 90 based on the ear height point 216. The ear width point 218 was determined to be spaced about 167 mm from the ear width point 220. However, it is contemplated that the ear width point 218 may be spaced from the ear width point 220 at a distance in a range from about 155 mm to about 175 mm.

An optimized position of the speakers 192 was determined based on the position of the ear width points 218, 220. Using the RAMSIS manikin, the distance between the speakers 192 and the adjacent ear width point 218, 220 is about 300 mm. The 300 mm distance may be a maximum distance between the speakers 192 and the adjacent ear width point 218, 220. It is also contemplated that the distance from the speakers 192 to the adjacent ear width point 218, 220 may be in a range from about 250 mm to about 350 mm. This distance is measured from a front of each speaker 192 and not from a front of the shroud assembly 36 or other features of the seating assembly 10.

Each ear width point 218, 220 is a distal point for an ear target zone 222, which are locations for the speakers 192 to direct the audio. Each ear target zone 222 may be a generally circular area with the respective ear width point 218, 220 being the most distal point on the circumference of the ear target zone 222. Accordingly, each ear target zone 222 extends between the ear line e and the torso line t. In certain aspects, when the ear width points 218, 220 are spaced about 300 mm from the speakers 192, then each ear target zone 222 extends from the ear line e to the torso line t, with a most proximal point on each ear target zone 222 lying on the torso line t.

The positioning of the speaker assembly 30 relative to the passenger maximizes the surround sound effect for the passenger, as well as optimizes the sound quality. The positioning of the speaker assembly 30 may also maintain a line of sight for the passenger positioned seating assembly 10. The above-described distances and angles were determined using the RAMSIS manikin representative of the 50th percentile of men in the United States and may be adjusted for different passengers based on these calculations. Accordingly, the data described above is exemplary for optimizing the sound of the speaker assembly 30 for the selected RAMSIS manikin and is not meant to be limiting.

Referring to FIGS. 1-17, the accessory support assembly 70 includes one or more of the speaker assembly 30, the display 38, and the massage assembly 44 to improve the experience of the passenger on the seating assemblies 10, 54, 58. Different seating assemblies 10, 54, 58 may include different configurations of the accessory support assembly 70 without departing from the teachings herein. The speaker assembly 30 is oriented in a first, generally vehicle-forward direction to provide a surround sound audio effect to the passenger within the seating assembly 10. The display 38 is generally oriented in a second, vehicle-rearward direction to be viewable by the passenger within the seating assembly 54. Accordingly, the accessory support assembly 70 directs sound in the first direction and includes the display 38 that is viewable from the second, opposing direction.

The support frame 24 supports and positions the speaker assembly 30, the display 38, and the massage assembly 44. The support frame 24 is secured to the seating assembly 10 by the engagement between the upper bracket 100 and the cross bracket 22, as well as by the engagement between the hooks 112 of the lower bracket 102 and the cross member 16. Additionally, the lower bracket 102 may be mechanically fastened or otherwise coupled to the cross member 16 adjacent to the bottom edges of each of the cross member 16 and the lower bracket 102. The first and second side projections 26, 28 may provide a structural connection between the speaker assembly 30 and the support frame 24, and consequently, the seatback frame 14. Additionally, the second edge 122 of the first and second side projections 26, 28 may assist in positioning the first and second speaker housings 32, 34 in the selected position to optimize the function of the speaker assembly 30.

Use of the present device may provide for a variety of advantages. For example, the support frame 24 may support and position one or more of the speaker assembly 30, the display 38, the massage assembly 44. The accessory support assembly 70 may have different configurations within the vehicle 12. Additionally, the speaker assembly 30 may provide a surround sound effect for the passenger in the seating assemblies 10, 54. The accessory support assembly 70 may provide an optimized "sound zone" for each passenger, as well as optimized screen viewing locations for passengers in the vehicle-rearward seating assemblies 54.

Further, the accessory support assembly 70 may provide personalized seat entertainment for passengers of the vehicle 12. Moreover, the support frame 24 may provide a load-bearing structure against passenger pull and abuse forces. Also, the accessory support assembly 70 may be assembled as a subsystem and shipped to a final assembly location for assembly on the seating assemblies 10, 54, 58. Further, the accessory support assembly 70 may be utilized with various configurations and models of the seating assemblies 10, 54, 58. Also, the support frame 24 provides a structural attachment for various features, such as the speaker assembly 30 and the massage assembly 44. Additionally, the support frame 24 provides a structural load-bearing feature, as well as optimizes feature attachment locations to deliver a personalized user experience. Also, the accessory support assembly 70 reduce manufacturing costs for seating assemblies 10. Additional benefits and advantages of using this device may also be realized and/or achieved.

According to various examples, a vehicle seating assembly includes a seatback frame that has a cross member. A headrest assembly includes support features operably coupled to the cross member. The headrest assembly includes a cross bracket that extends between the support features. A support frame is coupled to the cross bracket of the headrest assembly and the cross member of the seatback frame. The support frame includes first and second side projections. A speaker assembly includes first and second speaker housings coupled to the first and second side projections of the support frame, respectively. The speaker assembly directs sound in a first direction. A shroud assembly at least partially extends over the support frame. A display is coupled to the shroud assembly. The display is disposed between the first and second speaker housings and is viewable from a second direction. Embodiments of the present disclosure may include one or a combination of the following features:

- the support frame includes an upper bracket and a lower bracket, and wherein the upper bracket defines an aperture to provide space for the headrest assembly;
- a massage assembly is coupled to the support frame via the coupling features defined by the lower bracket;
- the cross bracket defines a support coupling plate that defines apertures for receiving the support features, and wherein the cross bracket defines a bracket coupling plate that extends from the support coupling plate and abuts an upper coupling member of the support frame;
- the shroud assembly includes a first shroud cover coupled to a first side of the seatback frame and defining speaker openings that align with the first and second speaker housings and a second shroud cover coupled to a second side of the seatback frame and a display opening that aligns with the display;
- a horizontal first edge and an angled second edge of each of the first and second side projections define an obtuse angle, and wherein the first and second housings are coupled to the angled second edges of the first and second side projections, respectively;
- a bottom of each of the first and second speaker housings is positioned at a similar angle to the respective obtuse angle of the side projections; and
- the cross bracket is disposed proximate a top of the shroud assembly.

According to various examples, a seat for a vehicle includes a seatback frame that has a cross member. A headrest assembly is operably coupled to the seatback frame. The headrest assembly includes a cross bracket. A support frame is coupled to the cross bracket and the cross member.

The support frame defines side projections. An angled edge of each side projection is disposed proximate a top of the cross member. A speaker assembly is coupled to the angled edge of at least one of the side projections of the support frame. The speaker assembly extends at least partially over the top of the cross member. Embodiments of the present disclosure may include one or a combination of the following features:

- a shroud cover extends over the support frame, and a display is coupled to an inner surface of the shroud cover, wherein the display is disposed between the side projections of the support frame;
- the speaker assembly includes a first speaker housing and a second speaker housing, and wherein the first speaker housing is coupled to an opposing side of the support frame relative to the second speaker housing;
- each of the first and second speaker housings defines an interior volume in a range from 160 $cm^3$ to 180 $cm^3$;
- each of the first and second speaker housings includes a proximal end adjacent to the support frame and a distal end, and wherein each of the first and second speaker housings has a greater height at the proximal end relative to the distal end, and
- the cross member includes a ridge, and wherein the support frame includes a hook that selectively engages the ridge.

According to various examples, an accessory support assembly for a vehicle seat includes a support frame that includes an upper bracket and a lower bracket coupled to a bottom of the upper bracket. The lower bracket includes coupling features. The lower bracket defines side projections that extend from opposing sides of the support frame. A speaker assembly is coupled to the support frame. The speaker assembly includes a first speaker housing and a second speaker housing. The first and second speaker housings are coupled to the side projections of the support frame, respectively. A speaker is disposed in each of the first and second housings. Embodiments of the present disclosure may include one or a combination of the following features:

- a massage assembly is coupled to the support frame via the coupling features defined by the lower bracket;
- a display is disposed between the first and second speaker housings and at least partially over the coupling features;
- the lower bracket includes a flange and a ledge extending from the flange, and wherein a hook extends from the flange and over the ledge to engage said vehicle seat;
- the upper bracket is disposed on the ledge, and wherein the upper bracket defines a notch for the hook of the lower bracket to extend through; and
- a first side of the upper bracket defines a first groove that is a mirror image of a second groove defined by a second side of the upper bracket, and wherein the first and second sides are disposed on opposing sides of an aperture defined by the upper bracket.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle seating assembly, comprising:
   a seatback frame having a cross member;
   a headrest assembly including support features operably coupled to the cross member, and wherein the headrest assembly includes a cross bracket extending between the support features;
   a support frame coupled to the cross bracket of the headrest assembly and the cross member of the seatback frame, wherein the support frame includes first and second side projections, wherein the support frame includes an upper bracket and a lower bracket, and wherein the upper bracket defines an aperture to provide space for the headrest assembly;
   a speaker assembly including first and second speaker housings coupled to the first and second side projections of the support frame, respectively, and wherein the speaker assembly directs sound in a first direction;
   a shroud assembly at least partially extending over the support frame; and
   a display coupled to the shroud assembly, wherein the display is disposed between the first and second speaker housings and is viewable from a second direction.

2. The vehicle seating assembly of claim 1, further comprising:
a massage assembly coupled to the support frame via the coupling features defined by the lower bracket.

3. The vehicle seating assembly of claim 1, wherein the cross bracket defines a support coupling plate that defines apertures for receiving the support features, and wherein the cross bracket defines a bracket coupling plate that extends from the support coupling plate and abuts an upper coupling member of the support frame.

4. The vehicle seating assembly of claim 1, wherein the shroud assembly includes a first shroud cover coupled to a first side of the seatback frame and defining speaker openings that align with the first and second speaker housings and a second shroud cover coupled to a second side of the seatback frame and a display opening that aligns with the display.

5. The vehicle seating assembly of claim 1, wherein a horizontal first edge and an angled second edge of each of the first and second side projections define an obtuse angle, and wherein the first and second housings are coupled to the angled second edges of the first and second side projections, respectively.

6. The vehicle seating assembly of claim 5, wherein a bottom of each of the first and second speaker housings is positioned at a similar angle to the respective obtuse angle of the side projections.

7. The vehicle seating assembly of claim 1, wherein the cross bracket is disposed proximate a top of the shroud assembly.

8. A seat for a vehicle, comprising:
a seatback frame having a cross member, wherein the cross member includes a ridge;
a headrest assembly operably coupled to the seatback frame, wherein the headrest assembly includes a cross bracket;
a support frame coupled to the cross bracket and the cross member, wherein the support frame includes a hook that selectively engages the ridge, wherein the support frame defines side projections, and wherein an angled edge of each side projection is disposed proximate a top of the cross member; and
a speaker assembly coupled to the angled edge of at least one of the side projections of the support frame, wherein the speaker assembly extends at least partially over the top of the cross member.

9. The seat of claim 8, further comprising:
a shroud cover extending over the support frame; and
a display coupled to an inner surface of the shroud cover, wherein the display is disposed between the side projections of the support frame.

10. The seat of claim 8, wherein the speaker assembly includes a first speaker housing and a second speaker housing, and wherein the first speaker housing is coupled to an opposing side of the support frame relative to the second speaker housing.

11. The seat of claim 10, wherein each of the first and second speaker housings defines an interior volume in a range from 160 $cm^3$ to 180 $cm^3$.

12. The seat of claim 10, wherein each of the first and second speaker housings includes a proximal end adjacent to the support frame and a distal end, and wherein each of the first and second speaker housings has a greater height at the proximal end relative to the distal end.

13. An accessory support assembly for a vehicle seat, comprising:
a support frame including:
an upper bracket; and
a lower bracket coupled to a bottom of the upper bracket and including coupling features, wherein the lower bracket defines side projections that extend from opposing sides of the support frame; and
a speaker assembly coupled to the support frame, wherein the speaker assembly includes:
a first speaker housing;
a second speaker housing, wherein the first and second speaker housings are coupled to the side projections of the support frame, respectively; and
a speaker disposed in each of the first and second housings.

14. The accessory support assembly of claim 13, further comprising:
a massage assembly coupled to the support frame via the coupling features defined by the lower bracket.

15. The accessory support assembly of claim 14, wherein the upper bracket is disposed on the ledge, and wherein the upper bracket defines a notch for the hook of the lower bracket to extend through.

16. The accessory support assembly of claim 13, further comprising:
a display disposed between the first and second speaker housings and at least partially over the coupling features.

17. The accessory support assembly of claim 13, wherein the lower bracket includes a flange and a ledge extending from the flange, and wherein a hook extends from the flange and over the ledge to engage said vehicle seat.

18. The accessory support assembly of claim 13, wherein a first side of the upper bracket defines a first groove that is a mirror image of a second groove defined by a second side of the upper bracket, and wherein the first and second sides are disposed on opposing sides of an aperture defined by the upper bracket.

* * * * *